United States Patent
Kotani et al.

(10) Patent No.: US 11,404,256 B2
(45) Date of Patent: Aug. 2, 2022

(54) SAMPLE SUPPORT, IONIZATION METHOD, AND MASS SPECTROMETRY METHOD

(71) Applicant: HAMAMATSU PHOTONICS K.K., Hamamatsu (JP)

(72) Inventors: Masahiro Kotani, Hamamatsu (JP); Takayuki Ohmura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/965,437

(22) PCT Filed: Jan. 16, 2019

(86) PCT No.: PCT/JP2019/001114
§ 371 (c)(1),
(2) Date: Jul. 28, 2020

(87) PCT Pub. No.: WO2019/155835
PCT Pub. Date: Aug. 15, 2019

(65) Prior Publication Data
US 2021/0057198 A1    Feb. 25, 2021

(30) Foreign Application Priority Data

Feb. 9, 2018 (JP) .............................. JP2018-021808

(51) Int. Cl.
*H01J 49/00* (2006.01)
*H01J 49/16* (2006.01)

(52) U.S. Cl.
CPC ........ *H01J 49/0031* (2013.01); *H01J 49/164* (2013.01)

(58) Field of Classification Search
USPC .......................................................... 250/282
See application file for complete search history.

(56) References Cited

U.S. PATENT DOCUMENTS

| | | | |
|---|---|---|---|
| 5,770,860 A | 6/1998 | Franzen | |
| 6,139,713 A * | 10/2000 | Masuda | C25D 11/16 205/206 |
| 9,166,133 B2 * | 10/2015 | Tsuda | H01L 25/0753 |
| 10,103,016 B2 * | 10/2018 | Naito | H01J 49/0418 |
| 10,971,345 B2 * | 4/2021 | Kotani | H01J 49/0004 |

(Continued)

FOREIGN PATENT DOCUMENTS

| | | |
|---|---|---|
| JP | 2004-354376 A | 12/2004 |
| JP | 3122331 U | 6/2006 |

(Continued)

OTHER PUBLICATIONS

International Preliminary Report on Patentability dated Aug. 20, 2020 for PCT/JP2019/001114.

(Continued)

*Primary Examiner* — Phillip A Johnston
(74) *Attorney, Agent, or Firm* — Faegre Drinker Biddle & Reath LLP (57) ABSTRACT

A sample support body is for ionization of a sample. The sample support body includes a substrate including a first surface and a second surface on sides opposite to each other, and a conduction layer provided at least on the first surface. A plurality of through-holes opening on the first surface and the second surface are formed in an effective region of the substrate, the effective region being for ionizing components of the sample. A width of a second opening on the second surface side is larger than a width of a first opening on the first surface side in each of the plurality of through-holes.

14 Claims, 8 Drawing Sheets

(56) References Cited

U.S. PATENT DOCUMENTS

| | | |
|---|---|---|
| 2002/0051738 A1 | 5/2002 | Schurenberg et al. |
| 2002/0094533 A1 | 6/2002 | Hess et al. |
| 2003/0062303 A1 | 4/2003 | Hoffman et al. |
| 2003/0178563 A1 | 9/2003 | Makarov et al. |
| 2005/0130222 A1 | 6/2005 | Lee |
| 2006/0026694 A1 | 2/2006 | Lanza et al. |
| 2006/0252047 A1 | 11/2006 | Ekstrom et al. |
| 2008/0179513 A1 | 7/2008 | Laprade et al. |
| 2008/0203291 A1 | 8/2008 | Wagner et al. |
| 2009/0095897 A1 | 4/2009 | Okuno et al. |
| 2010/0233038 A1* | 9/2010 | Park .................. B01L 3/502715 422/504 |
| 2010/0244339 A1 | 9/2010 | Yoon et al. |
| 2014/0264581 A1 | 9/2014 | Chan et al. |
| 2015/0209701 A1 | 7/2015 | Fomenkov et al. |
| 2017/0168389 A1 | 6/2017 | Park et al. |
| 2017/0358436 A1 | 12/2017 | Naito et al. |
| 2018/0158660 A1 | 6/2018 | Naito et al. |
| 2019/0001966 A1 | 1/2019 | Swamidason |

FOREIGN PATENT DOCUMENTS

| | | |
|---|---|---|
| JP | 2006-517671 A | 7/2006 |
| JP | 2007-121135 A | 5/2007 |
| JP | 2007-247070 A | 9/2007 |
| JP | 2007-309860 A | 11/2007 |
| JP | 2009-080106 A | 4/2009 |
| JP | 2009-120892 A | 6/2009 |
| JP | 2010-071664 A | 4/2010 |
| JP | 4674875 B2 | 4/2011 |
| JP | 2014-013201 A | 1/2014 |
| JP | 6093492 B1 | 3/2017 |
| WO | WO-2004/072616 A2 | 8/2004 |
| WO | WO-2014/020939 A1 | 2/2014 |
| WO | WO-2017/038709 A1 | 3/2017 |
| WO | WO-2017/038710 A1 | 3/2017 |
| WO | WO-2017/159878 A1 | 9/2017 |

OTHER PUBLICATIONS

International Preliminary Report on Patentability dated Aug. 20, 2020 for PCT/JP2019/003229.

International Preliminary Report on Patentability dated Aug. 20, 2020 for PCT/JP2018/045700.

Office Action dated Jun. 30, 2021 in U.S. Appl. No. 16/965,460.

Office Action dated Jun. 30, 2021 in U.S. Appl. No. 16/966,758.

* cited by examiner

SAMPLE SUPPORT, IONIZATION METHOD, AND MASS SPECTROMETRY METHOD

TECHNICAL FIELD

The present disclosure relates to a sample support body, an ionization method, and a mass spectrometry method.

BACKGROUND ART

Conventionally, a laser desorption/ionization method is known as a method of ionizing a sample such as a biological sample to perform, for instance, mass spectrometry. As a sample support body used in the laser desorption/ionization method, one including a substrate in which a plurality of through-holes are formed and a conductive layer that is provided on at least one surface of the substrate is described in Patent Literature 1.

CITATION LIST

Patent Literature
 Patent Literature 1: Japanese Patent No. 6093492

SUMMARY OF INVENTION

Technical Problem

Components of the ionized sample are detected in mass spectrometry, and mass spectrometry of the sample is performed on the basis of the detection results. Therefore, an improvement in signal intensity (sensitivity) of the components of the ionized sample is desired in mass spectrometry.

The present disclosure is directed to providing a sample support body, an ionization method, and a mass spectrometry method capable of improving signal intensity of components of an ionized sample in mass spectrometry.

Solution to Problem

A sample support body of an aspect of the present disclosure is for ionization of a sample, and includes: a substrate including a first surface and a second surface on sides opposite to each other; and a conductive layer provided at least on the first surface. A plurality of through-holes opening on the first surface side and the second surface are formed in an effective region of the substrate, the effective region being for ionizing components of the sample. A width of a second opening on the second surface side is larger than a width of a first opening on the first surface side in each of the plurality of through-holes.

In the sample support body, the width of the second opening on the second surface side is larger than the width of the first opening on the first surface side in each of the plurality of through-holes. For this reason, for example, if the sample support body is disposed such that the second surface faces the sample, components of the sample move smoothly toward the first surface through the plurality of through-holes, and the components of the sample stay at the first surface side in an appropriate state. Therefore, if the first surface is irradiated with an energy beam while a voltage is applied to the conductive layer, the components of the sample are reliably ionized. Therefore, according to the sample support body, signal intensity of the ionized components of the sample can be improved in mass spectrometry.

In the sample support body of the aspect of the present disclosure, when viewed in a direction in which the first surface and the second surface are opposite to each other, an outer edge of the second opening may be located outside an outer edge of the first opening in each of the plurality of through-holes. Thus, for example, when the sample support body is disposed such that the second surface faces the sample, components of the sample move more smoothly toward the first surface through the plurality of through-holes, and the components of the sample can be made to stay at the first surface side in a more appropriate state.

In the sample support body of the aspect of the present disclosure, each of the plurality of through-holes may include a first portion on the first opening side and a second portion on the second opening side, and the second portion may have a funnel shape expanding toward the second opening. Alternatively, in the sample support body of the aspect of the present disclosure, each of the plurality of through-holes may have a frustum shape expanding toward the second opening. In any case, for example, when the sample support body is disposed such that the second surface faces the sample, components of the sample move smoothly toward the first surface through the plurality of through-holes, and the components of the sample can be made to stay at the first surface side in an appropriate state.

In the sample support body of the aspect of the present disclosure, a minimum value of the width may be 1 nm and a maximum value of the width may be 700 nm in each of the plurality of through-holes. Thus, for example, when sample support body is disposed such that the second surface faces the sample, components of the sample move smoothly toward the first surface through the plurality of through-holes, and the components of the sample can be made to stay at the first surface side in an appropriate state.

In the sample support body of the aspect of the present disclosure, the substrate may be formed by anodizing a valve metal or silicon. Thus, the substrate in which the plurality of through-holes are formed can be easily and reliably obtained.

In the sample support body of the aspect of the present disclosure, the conductive layer may be formed of platinum or gold. Thus, the conductive layer suitable for ionization of the sample can be easily and reliably obtained.

An ionization method of another aspect of the present disclosure includes: a first process of preparing the sample support body described above; a second process of mounting the sample on a mount surface of a mount portion, and mounting the sample support body on the mount surface such that the second surface faces the sample; and a third process of ionizing components of the sample having moved to the first surface side through the plurality of through-holes by irradiating the first surface with an energy beam while applying a voltage to the conductive layer.

According to the ionization method, since the aforementioned sample support body is used, signal intensity of the ionized components of the sample can be improved in mass spectrometry.

A mass spectrometry method of another aspect of the present disclosure includes: the first process, the second process, and the third process of the ionization method described above; and a fourth process of detecting the components ionized in the third process.

According to the mass spectrometry method, since the aforementioned sample support body is used, signal intensity of the ionized components of the sample can be improved in mass spectrometry.

Advantageous Effects of Invention

According to the present disclosure, a sample support body, an ionization method, and a mass spectrometry method capable of improving signal intensity of components of an ionized sample in mass spectrometry can be provided.

DESCRIPTION OF EMBODIMENTS

Hereinafter, an embodiment of the present disclosure will be described in detail with reference to the drawings. Note that the same or equivalent portions are denoted by the same reference signs in each of the drawings, and duplicate descriptions thereof will be omitted.

Figure 1:
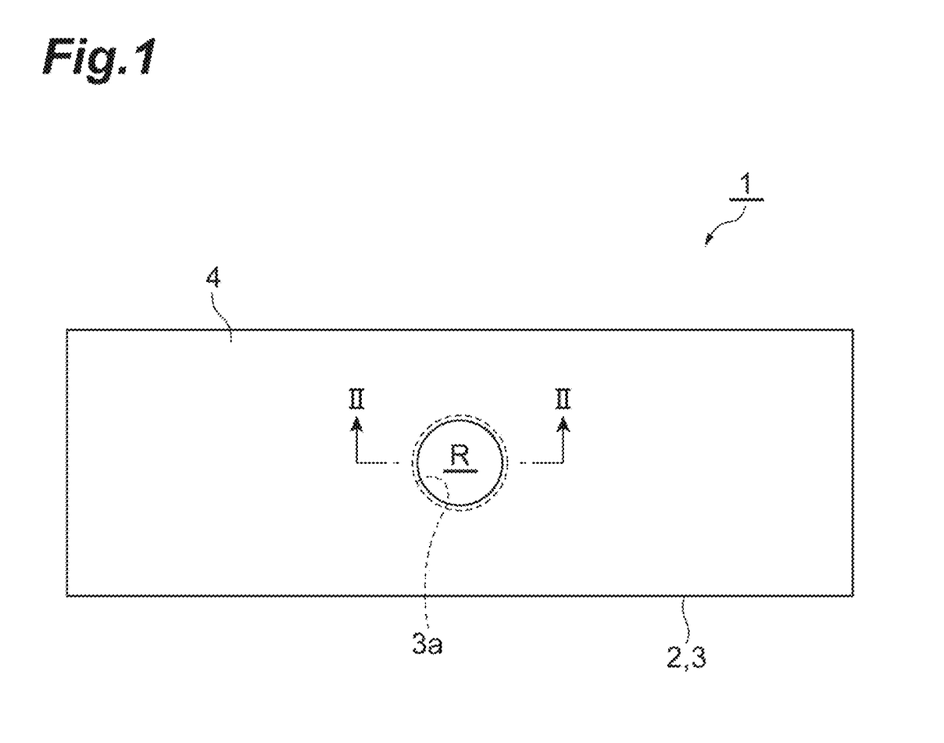
FIG. 1 is a top view of a sample support body of an embodiment.
Figure 2:
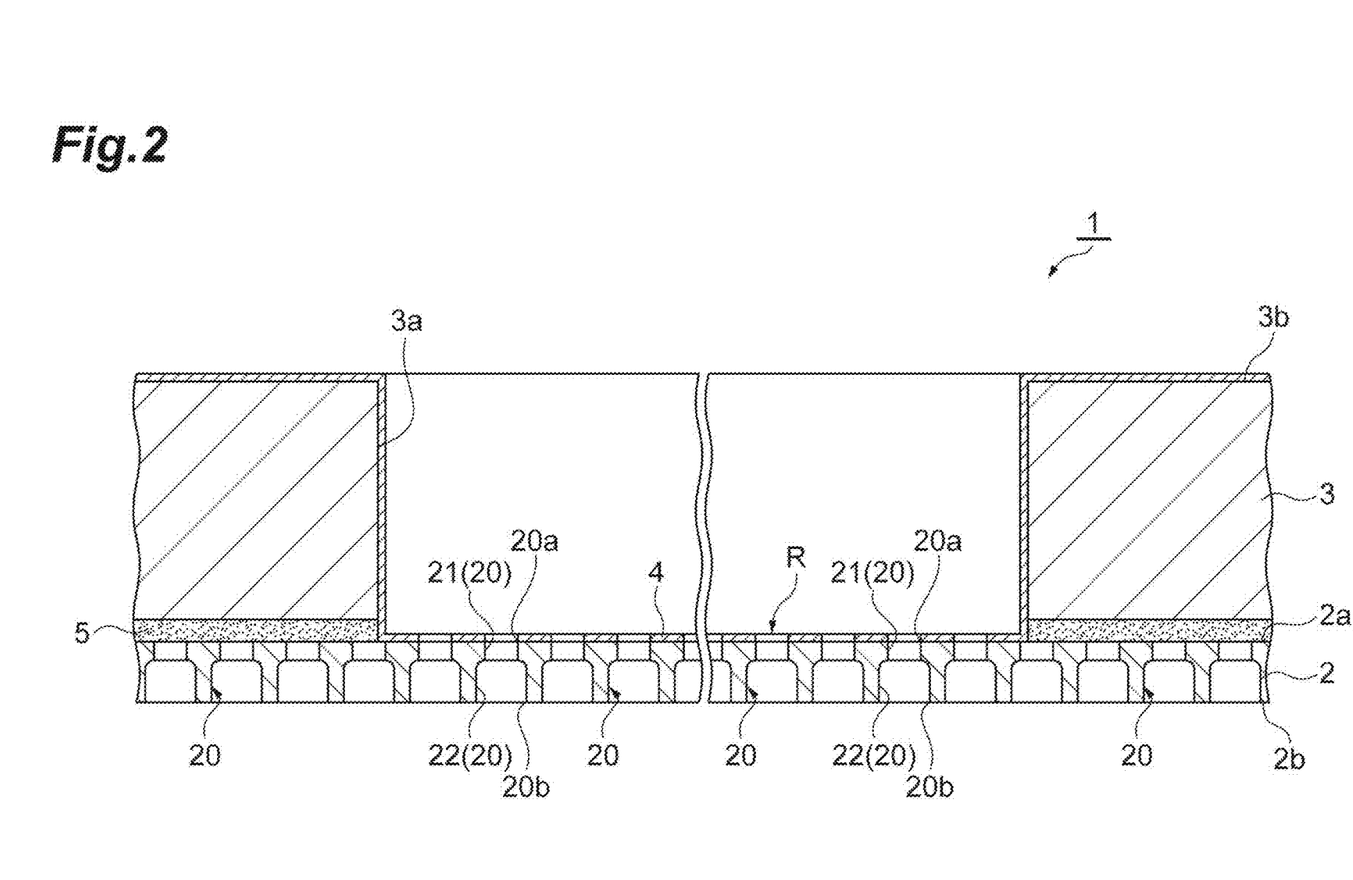
FIG. 2 is a sectional view of the sample support body along line II-II illustrated in FIG. 1.

As illustrated in FIGS. 1 and 2, a sample support body 1 is used for ionization of a sample, and includes a substrate 2, a frame 3, and a conductive layer 4. The substrate 2 includes a first surface 2a and a second surface 2b on sides opposite to each other. A plurality of through-holes 20 are formed in the substrate 2 in a uniform manner (with uniform distribution). Each of the through-holes 20 extends in a thickness direction of the substrate 2 (a direction in which the first surface 2a and the second surface 2b are opposite to each other), and opens on the first surface 2a and the second surface 2b.

The substrate 2 is formed of, for instance, an insulating material in the shape of a rectangular plate. When viewed in the thickness direction of the substrate 2, a length of one side of the substrate 2 is, for instance, several centimeters, and a thickness of the substrate 2 is, for instance, about 1 µm to 50 µm. In each of the through-holes 20, a width of a second opening 20b on the second surface 2b side is larger than a width of a first opening 20a on the first surface 2a side. When viewed in the thickness direction of the substrate 2, an outer edge of the second opening 20b in each of the through-holes 20 is located outside of an outer edge of the first opening 20a. That is, when viewed in the thickness direction of the substrate 2, the outer edge of the second opening 20b in each of the through-holes 20 includes the outer edge of the first opening 20a.

The widths of the first openings 20a are diameters of the first openings 20a in a case where shapes of the first openings 20a are nearly circular shapes when viewed in the thickness direction of the substrate 2, and are diameters (effective diameters) of virtual maximum circles fitted into the shapes in a case where the shapes are other than the nearly circular shapes. Likewise, the widths of the second opening 20b are diameters of the second opening 20b in a case where shapes of the second opening 20b are nearly circular shapes when viewed in the thickness direction of the substrate 2, and are diameters (effective diameters) of virtual maximum circles inscribed in the shapes in a case where the shapes are something other than the nearly circular shapes.

In the present embodiment, the widths of the second openings 20b are about twice the widths of the first openings 20a.

Each of the through-holes 20 includes a first portion 21 on the first opening 20a side, and a second portion 22 on the second opening 20b side. The first portion 21 has a columnar shape. The second portion 22 has a funnel shape expanding toward the second opening 20b. A center line of the first portion 21 and a center line of the second portion 22 are identical to each other. In each of the through-holes 20, a minimum value of the width is 1 nm and a maximum value of the width is 700 nm. Here, the widths of the through-holes 20 are diameters of the through-holes 20 in a case where cross-sectional shapes of the through-holes 20 perpendicular to the thickness direction of the substrate 2 are nearly circular shapes, and are diameters (effective diameters) of virtual maximum circles inscribed in the cross-sectional shapes in a case where the cross-sectional shapes are something other than the nearly circular shapes. In the present embodiment, the minimum value of the width is a diameter of the first portion 21 and the maximum value of the width is the diameter of the second opening 20b.

The frame 3 is provided on the first surface 2a of the substrate 2. To be specific, the frame 3 is fixed to the first surface 2a of the substrate 2 by an adhesive layer 5. As a material of the adhesive layer 5, an adhesive material (e.g., a low melting point glass, an adhesive for vacuum, etc.) having little discharge gas is preferably used. When viewed in the thickness direction of the substrate 2, the frame 3 has nearly the same outline as the substrate 2. An opening 3a is formed in the frame 3. A portion of the substrate 2 which corresponds to the opening 3a functions as an effective region R for ionizing components of a sample.

The frame 3 is formed of, for instance, an insulating material in the shape of a rectangular plate. When viewed in the thickness direction of the substrate 2, a length of one side of the frame 3 is, for instance, several centimeters, and a thickness of the frame 3 is, for instance, 1 mm or less. When viewed in the thickness direction of the substrate 2, a shape of the opening 3a is, for instance, a circular shape. In that case, a diameter of the opening 3a is, for instance, several millimeters to tens of millimeters. Due to this frame 3, handling of the sample support body 1 is facilitated, and deformation of the substrate 2 caused by, for instance, a change in temperature is curbed.

The conductive layer 4 is provided on the first surface 2a of the substrate 2. To be specific, the conductive layer 4 is continuously (integrally) formed in a region of the first surface 2a of the substrate 2 which corresponds to the opening 3a of the frame 3 (i.e., a region corresponding to the effective region R), an inner surface of the opening 3a, and a surface 3b of the frame 3 which is located on the side opposite to the substrate 2. The conductive layer 4 covers a portion of the first surface 2a of the substrate 2 at which the through-holes 20 are not formed in the effective region R. That is, the through-holes 20 are exposed to the opening 3a in the effective region R The conductive layer 4 is formed of a conductive material. In the present embodiment, the conductive layer 4 is formed of platinum (Pt) or gold (Au). In this way, as a material of the conductive layer 4, for the reason to be described below, a metal having a low affinity (reactivity) with a sample and high conductivity is preferably used.

For example, if the conductive layer 4 is formed of a metal such as copper (Cu) that has a high affinity with a sample such as a protein, the sample is ionized in a state in which Cu atoms are attached to sample molecules in a process (to be described below) of ionizing the sample, and there is a chance of detected results deviating in mass spectrometry (to be described below) according to the attached Cu atoms. Therefore, as the material of the conductive layer 4, a metal having a low affinity with a sample is preferably used.

Meanwhile, a constant voltage is easily applied to a metal having higher conductivity in an easy and stable way. For this reason, if the conductive layer 4 is formed of a high-conductivity metal, a voltage can be uniformly applied to the first surface 2a of the substrate 2 in the effective region R. Further, a metal having higher conductivity also shows a tendency to have higher thermal conductivity. For this reason, if the conductive layer 4 is formed of a high-conductivity metal, the energy of a laser beam (an energy beam) applied to the substrate 2 can be efficiently transmitted to a sample via the conductive layer 4. Therefore, as the material of the conductive layer 4, a high-conductivity metal is preferably used.

In view of the above, for example, Pt, Au, or the like is preferably used as the material of the conductive layer 4. For example, the conductive layer 4 is formed at a thickness of about 1 nm to 350 nm using a plating method, an atomic layer deposition (ALD) method, a vapor deposition method, a sputtering method, or the like. For example, chromium (Cr), nickel (Ni), titanium (Ti), or the like may be used as the material of the conductive layer 4.

Figure 3:
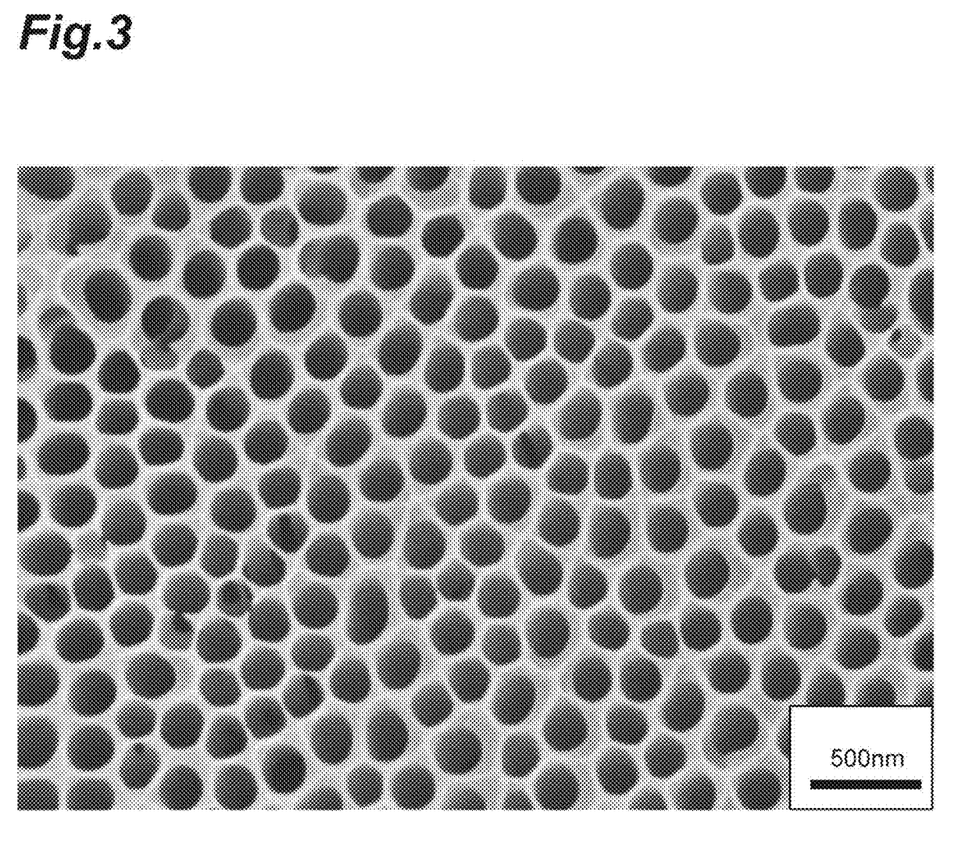
FIG. 3 is a view illustrating an enlarged image of a substrate of the sample support body illustrated in FIG. 1.

FIG. 3 is a view illustrating an enlarged image of the substrate 2 in the thickness direction of the substrate 2. In FIG. 3, black portions are the through-holes 20, and white portions are partition wall portions between the through-holes 20. As illustrated in FIG. 3, the plurality of through-holes 20 having approximately constant widths are uniformly formed in the substrate 2. An aperture ratio of the through-holes 20 in the effective region R (a ratio of all the through-holes 20 to the effective region R when viewed in the thickness direction of the substrate 2) ranges from 10% to 80% in view of practical use, and particularly preferably ranges from 60% to 80%. The sizes of the plurality of through-holes 20 may not all be uniform, and the plurality of through-holes 20 may be partially coupled to one another.

Figure 4:
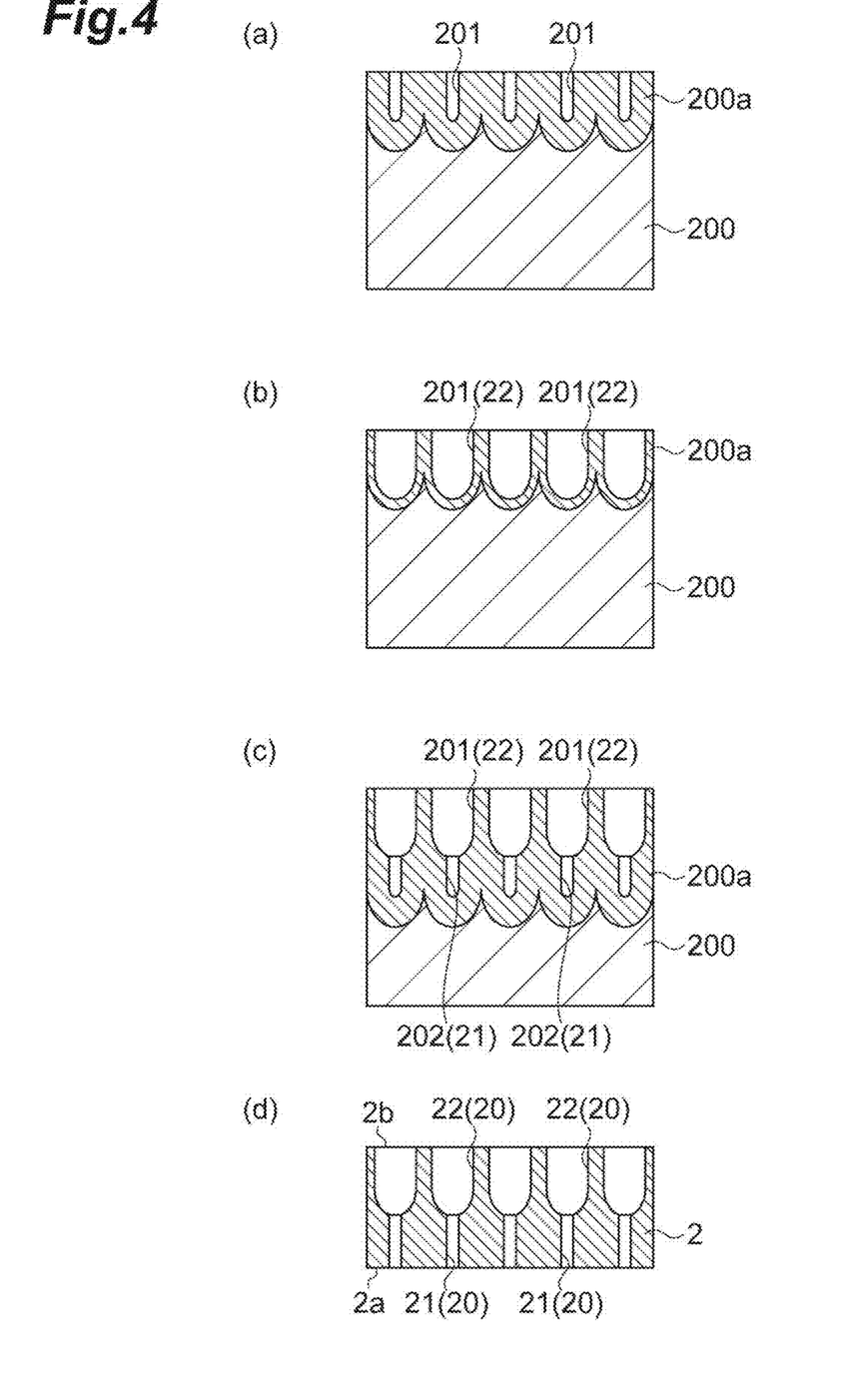
FIG. 4 is a view illustrating manufacturing processes of the substrate of the sample support body illustrated in FIG. 1.

The substrate 2 illustrated in FIG. 3 is an alumina porous film formed by anodizing aluminum (Al). To be specific, as illustrated in (a) of FIG. 4, by performing anodizing treatment on an Al substrate 200, a surface portion 200a of the Al substrate 200 is oxidized, and a plurality of pores 201 are formed in the surface portion 200a of the Al substrate 200. Next, as illustrated in (b) of FIG. 4, a diameter of each of the pores 201 is enlarged by performing pore widening treatment on the Al substrate 200. Each of the pores 201 whose diameter is enlarged is equivalent to the second portion 22 of the substrate 2. Next, as illustrated in (c) of FIG. 4, by performing anodizing treatment on the Al substrate 200, the surface portion 200a of the Al substrate 200 is oxidized more deeply, and pores 202 are formed in bottoms of the pores 201 whose diameters are enlarged. Each of the pores 202 is equivalent to the first portion 21 of the substrate 2. Next, the substrate 2 is obtained by peeling the oxidized surface portion 200a from the Al substrate 200 as illustrated in (d) of FIG. 4.

The substrate 2 may be formed by anodizing a valve metal other than Al such as tantalum (Ta), niobium (Nb), titanium (Ti), hafnium (Hf), zirconium (Zr), zinc (Zn), tungsten (W), bismuth (Bi), antimony (Sb), or the like. Alternatively, the substrate 2 may be formed by anodizing silicon (Si).

Figure 5:
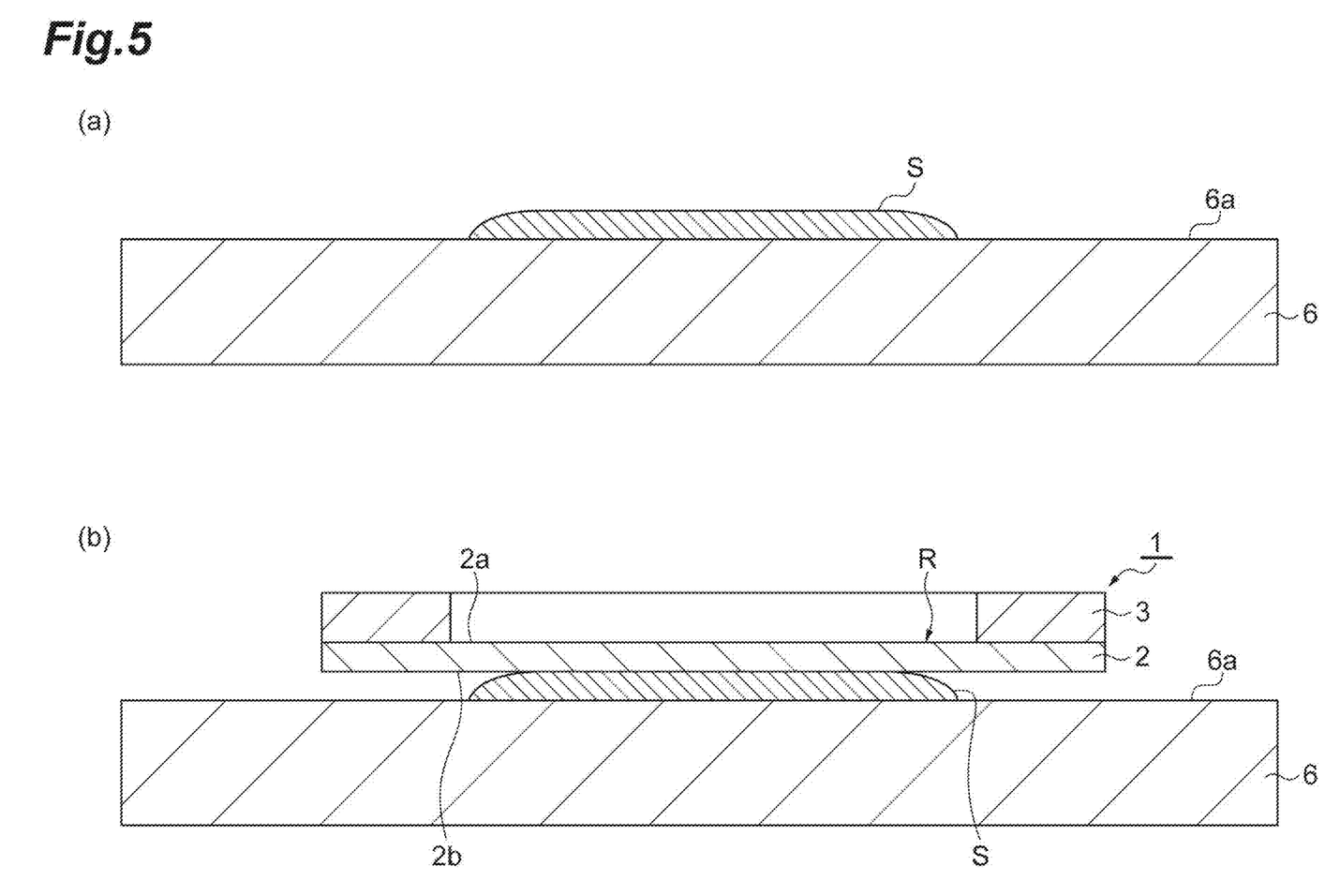
FIG. 5 is a view illustrating a process of a mass spectrometry method of an embodiment.
Figure 6:
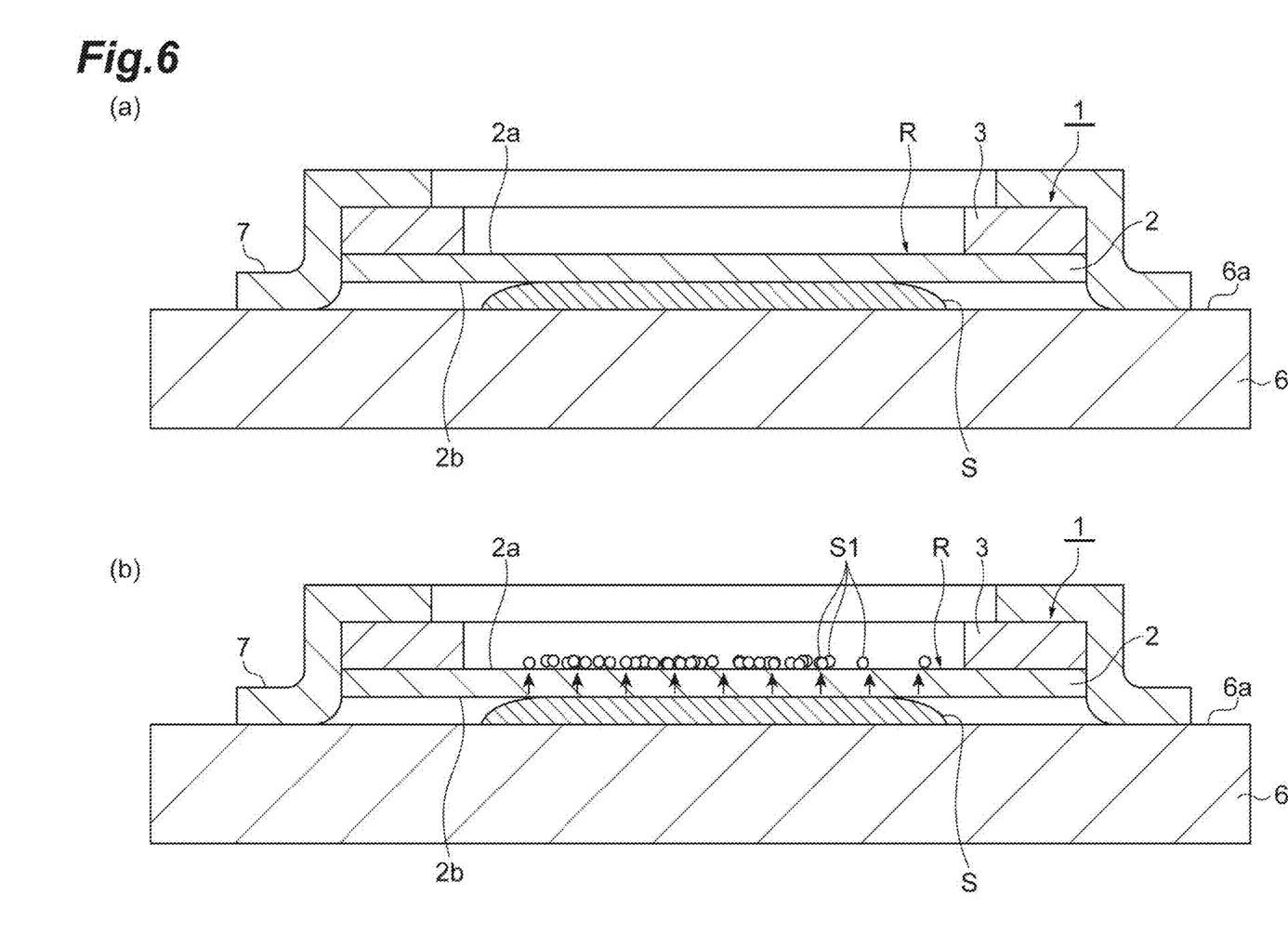
FIG. 6 is a view illustrating a process of the mass spectrometry method of the embodiment.
Figure 7:
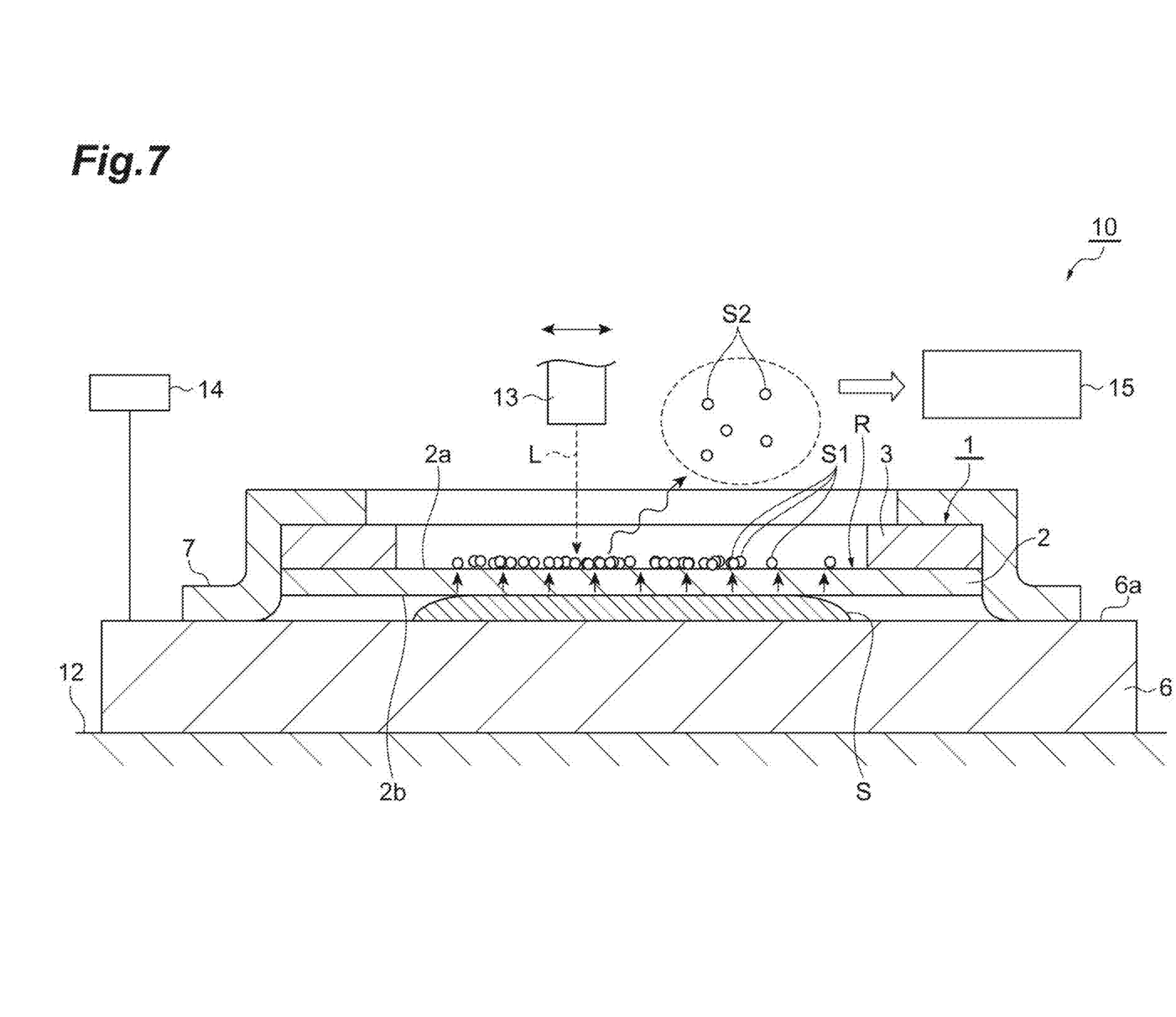
FIG. 7 is a view illustrating a process of the mass spectrometry method of the embodiment.

Next, an ionization method and a mass spectrometry method using the sample support body 1 will be described. In FIGS. 5 to 7, the through-holes 20, the conductive layer 4, and the adhesive layer 5 are not illustrated in the sample support body 1. Further, for convenience of illustration, ratios of dimensions are different in the sample support body 1 illustrated in FIGS. 1 and 2 and the sample support body 1 illustrated in FIGS. 5 to 7.

First, the aforementioned sample support body 1 is prepared (a first process). The sample support body 1 may be prepared by being manufactured by a person who carries out the ionization method and the mass spectrometry method, or be prepared by being obtained from a manufacturer or a seller of the sample support body 1.

Next, as illustrated (a) of in FIG. 5, the sample S is mounted on a mount surface 6a of a slide glass (a mount portion) 6 (a second process). The sample S is, for example, a thin-film biological sample (hydrous sample) such as tissue section. The slide glass 6 is a glass substrate on which a transparent conductive film such as an indium tin oxide (ITO) film is formed, and a surface of the transparent conductive film becomes the mount surface 6a. Without being limited to the slide glass 6, a member capable of securing conductivity (e.g., a substrate formed of a metal material such as stainless steel) may be used as the mount. Next, as illustrated in (b) of FIG. 5, the sample support body 1 is mounted on the mount surface 6a such that the second surface 2b of the substrate 2 faces the sample S (the second process). At this time, the sample S is disposed in the effective region R when viewed in the thickness direction of the substrate 2. Next, as illustrated in (a) of FIG. 6, the sample support body 1 is fixed to the slide glass 6 by a conductive tape 7 (e.g., a carbon tape, or the like).

Thus, as shown in (b) of FIG. 6, components S1 of the sample S move toward first surface 2a of the substrate 2 through a plurality of through-holes 20 (see FIG. 2) due to capillary phenomenon, and the moved components S1 of the sample S stay at the first surface 2a side due to surface tension. Therefore, the components S1 of the sample S reliably stay on the first surface 2a side of the substrate 2.

Next, as illustrated in FIG. 7, in a state in which the sample S is disposed between the slide glass 6 and the sample support body 1, the slide glass 6, the sample support body 1, and the sample S are mounted on a support 12 (e.g., a stage) of a mass spectrometer 10. Next, a voltage is applied to the conductive layer 4 of the sample support body 1 (see FIG. 2) via the mount surface 6a of the slide glass 6 and the tape 7 by a voltage application part 14 of the mass spectrometer 10 (a third process). Next, the first surface 2a of the substrate 2 is irradiated with a laser beam (an energy beam) L through the opening 3a of the frame 3 by a laser beam irradiation part 13 of the mass spectrometer 10 (the third process). That is, a region of the first surface 2a of the substrate 2 is irradiated with the laser beam L, the region corresponding to the opening 3a of the frame 3 (i.e., the region corresponding to the effective region R). In the present embodiment, the laser beam irradiation part 13 scans the laser beam L onto the region corresponding to the effective region R. At least one of the support 12 and the laser beam irradiation part 13 is operated, and thus the scanning of the laser beam L onto the region corresponding to the effective region R can be performed.

In this way, the first surface 2a of the substrate 2 is irradiated with the laser beam L while a voltage is applied to the conductive layer 4. Thus, the components S1 of the sample S which have moved to the first surface 2a side of the substrate 2 through the plurality of through holes 20 are ionized, and sample ions S2 (ionized components S1) are discharged (the third process). To be specific, energy is transmitted from the conductive layer 4 (see FIG. 2) absorbing energy of the laser beam L to the components S1 of the sample S which stay on the first surface 2a side of the substrate 2, and the components S1 of the sample S which obtain the energy are evaporated and obtain electric charges to become the sample ions S2. The above first to third processes are equivalent to the ionization method using the sample support body 1 (in the present embodiment, a laser desorption/ionization method).

The discharged sample ions S2 move while being accelerated toward a ground electrode (not illustrated) provided between the sample support body 1 and the ion detector 15. That is, the sample ions S2 move while being accelerated toward the ground electrode by a potential difference between the conductive layer 4 to which a voltage is applied and the ground electrode. The sample ions S2 are detected by the ion detector 15 of the mass spectrometer 10 (a fourth process). In the present embodiment, the ion detector 15 detects the sample ions S2 to correspond to the scanning position of the laser beam L. Thus, the two-dimensional distribution of molecules forming the sample S can be imaged. Further, in the present embodiment, the mass spectrometer 10 is a scanning mass spectrometer using time-of-flight mass spectrometry (TOF-MS). The above first to fourth processes are equivalent to the mass spectrometry method using the sample support body 1.

As described above, in the sample support body 1, the width of the second opening 20b on the second surface 2b side is larger than the width of the first opening 20a on the first surface 2a side in each of the plurality of through-holes 20. For this reason, for example, if the sample support body 1 is disposed such that the second surface 2b faces the sample S, components S1 of the sample S move smoothly toward the first surface 2a through the plurality of through-holes 20, and the components S1 of the sample S stay on the first surface 2a side in an appropriate state. Therefore, if the first surface 2a is irradiated with the laser beam L while the voltage is applied to the conductive layer 4, the components S1 of the sample S are reliably ionized. Therefore, according to the sample support body 1, signal intensity of the ionized components S1 of the sample S can be improved in mass spectrometry.

Further, in the sample support body 1, when viewed in the thickness direction of the substrate 2, the outer edge of the second opening 20b is located outside the outer edge of the first opening 20a in each of the plurality of through-holes 20. Thus, for example, when the sample support body 1 is disposed such that the second surface 2b faces the sample S, components S1 of the sample S move more smoothly toward the first surface 2a through the plurality of through-holes 20, and the components S1 of the sample S can be made to stay on the first surface 2a side in a more appropriate state.

Further, in the sample support body 1, each of the plurality of through-holes 20 includes the first portion 21 on the first opening 20a side and the second portion 22 on the second opening 20b side, and the second portion 22 has a funnel shape expanding toward the second opening 20b. Thus, for example, when the sample support body 1 is disposed such that the second surface 2b faces the sample S, components S1 of the sample S move smoothly toward the first surface 2a through the plurality of through-holes 20, and the components S1 of the sample S can be made to stay on the first surface 2a side in an appropriate state.

Further, in the sample support body 1, the minimum value of the width is 1 nm and the maximum value of the width is 700 nm in each of the plurality of through-holes 20. Thus, for example, when the sample support body 1 is disposed such that the second surface 2b faces the sample S, components S1 of the sample S move smoothly toward the first surface 2a through the plurality of through-holes 20, and the components S1 of the sample S can be made to stay on the first surface 2a side in an appropriate state.

Further, in the sample support body 1, the substrate 2 is formed by anodizing the valve metal or the silicon. Thus, the substrate 2 in which the plurality of through-holes 20 are formed can be easily and reliably obtained.

Further, in the sample support body 1, the conductive layer 4 is formed of Pt or Au. Thus, the conductive layer 4 suitable for ionization of the sample S can be easily and reliably obtained.

According to the aforementioned ionization method and mass spectrometry method, since the aforementioned sample support body 1 is used, the signal intensity of the ionized components S1 of the sample S can be improved in mass spectrometry.

Figure 8:
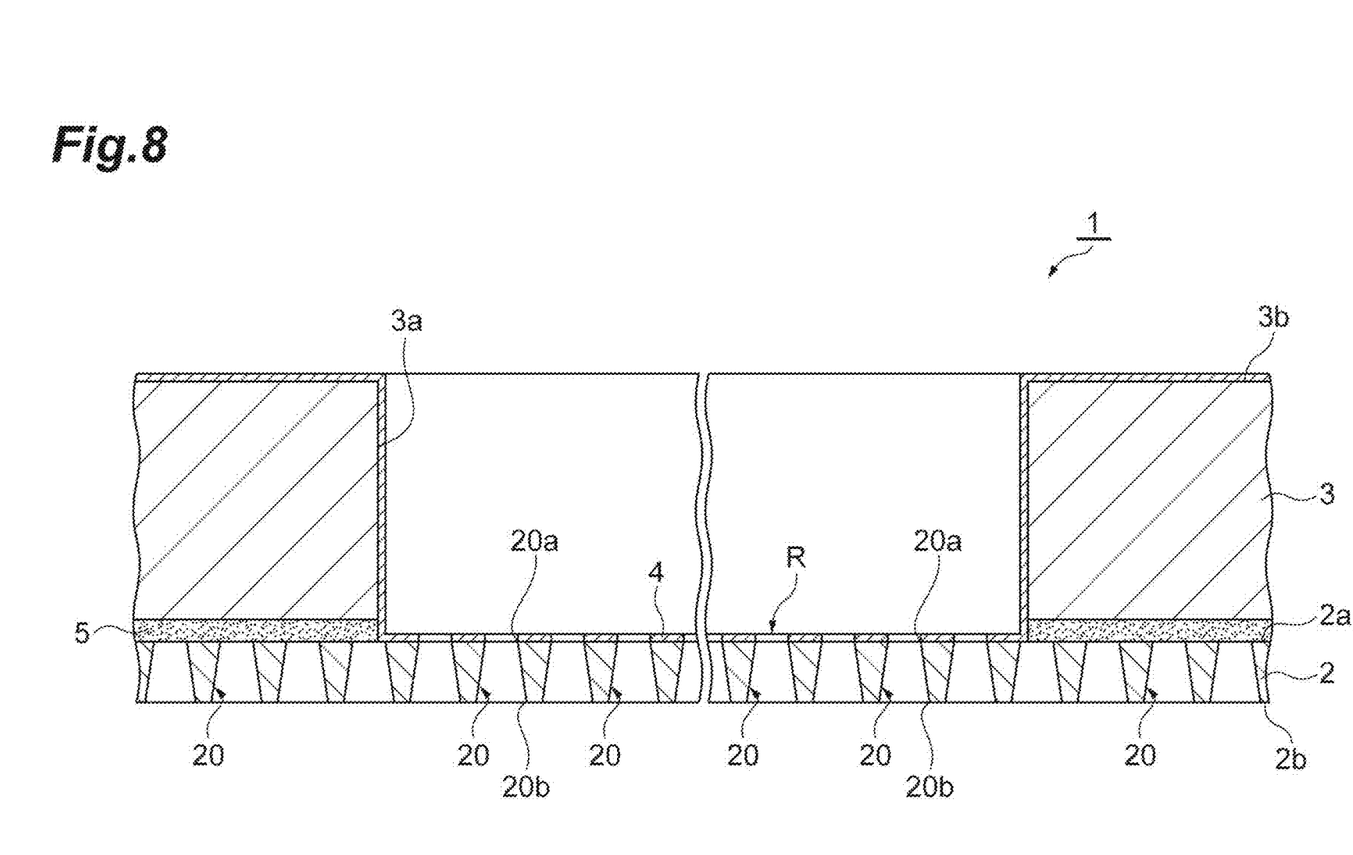
FIG. 8 is a sectional view of a sample support body of a modification.

The present disclosure is not limited to the aforementioned embodiment. For example, as illustrated in FIG. 8, each of the plurality of through-holes 20 may have a frustum shape expanding toward the second opening 20b. Even in this case, for example, when the sample support body 1 is disposed such that the second surface 2b faces the sample S, components S1 of the sample S move smoothly toward the first surface 2a through the plurality of through-holes 20, and the components S1 of the sample S can be made to stay on the first surface 2a side in an appropriate state. Further, in this case, strength of the substrate 2 can be improved. The shape of each of the through-holes 20 is not limited to the foregoing shape, and may be a shape in which the width of the second opening 20b on the second surface 2b side is larger than the width of the first opening 20a on the first surface 2a side (e.g., a shape in which the widths of the through-holes 20 increase continuously or stepwise toward the second opening 20b). However, when viewed in the thickness direction of the substrate 2, the outer edge of the second opening 20b is preferably located outside the outer edge of the first opening 20a in each of the plurality of through-holes 20.

Further, in the aforementioned embodiment, one effective region R is provided on the substrate 2, but a plurality of effective regions R may be provided on the substrate 2. Further, the plurality of through-holes 20 need not be formed only in the effective region R, and as in the aforementioned embodiment, for example, the plurality of through-holes 20 may be formed throughout substrate 2. That is, the plurality of through-holes 20 may be formed at least in the effective region R. Further, in the aforementioned embodiment, the sample S is disposed such that one sample S corresponds to one effective region R, but the sample S may be disposed such that a plurality of samples S correspond to one effective region R.

Further, the conductive layer 4 may be provided at least on the first surface 2a. Therefore, the conductive layer 4 may be provided, for instance, on an inner surface of the first portion 21 of each of the through-holes 20 in addition to the first surface 2a. Alternatively, the conductive layer 4 may be provided, for instance, on the second surface 2b of the substrate 2 and on an inner surface of each of the through-holes 20 in addition to the first surface 2a.

Further, in the second process, the sample support body 1 may be fixed to the slide glass 6 by a means other than the tape 7 (e.g., a means using an adhesive, a fixing tool, etc.). Further, in the third process, the voltage may be applied to the conductive layer 4 without using the mount surface 6a of the slide glass 6 and the tape 7. In that case, the slide glass 6 and the tape 7 may not have conductivity. Further, the tape 7 may be a part of the sample support body 1. In the case where the tape 7 is a part of the sample support body 1 (i.e., in the case where the sample support body 1 includes the tape 7), the tape 7, for example, may be previously fixed on the first surface 2a side on a circumferential edge of the substrate 2, or be previously fixed on the conductive layer 4 formed on the surface 3b of the frame 3.

Further, in the mass spectrometer 10, the laser beam irradiation part 13 may irradiate the region corresponding to the effective region R with the laser beam L all at once and the ion detector 15 may detect sample ions S2 while maintaining two-dimensional information of the region. That is, the mass spectrometer 10 may be a projection type mass spectrometer. Further, the aforementioned ionization method can also be used for other measurement such as ion mobility measurement and other experiments.

Further, the use of the sample support body 1 is not limited to the ionization of the sample S caused by the irradiation of the laser beam L. The sample support body 1 may be used for the ionization of the sample S caused by irradiation of an energy beam such as a laser beam, an ion beam, or an electron beam. In the aforementioned ionization method and mass spectrometry method, the sample S can be ionized by the irradiation of the energy beam.

Further, the sample S is not limited to hydrous sample and may be a dry sample. In that case, in the second process, the sample support body 1 is mounted on the mount surface 6a such that the second surface 2b faces the sample S, and then, a predetermined solution is dropped to the plurality of through-holes 20 from the first surface 2a side, for example. Thus, components S1 of the sample S move smoothly toward the first surface 2a through the plurality of through-holes 20, and the components S1 of the sample S can be made to stay on the first surface 2a side in an appropriate state. Further, in the second process, a solution containing the sample S may be placed on the mount surface 6a, and the sample support body 1 may be mounted on the mount surface 5a such that the second surface 2b faces the solution containing the sample S. Also in that case, components S1 of the sample S move smoothly toward the first surface 2a through the plurality of through-holes 20, and the components S1 of the sample S can be made to stay on the first surface 2a side in an appropriate state.

REFERENCE SIGNS LIST

1: sample support body, 2: substrate, 2a: first surface, 2b: second surface, 4: conductive layer, 6: slide glass (mount portion), 6a: mount surface, 20: through-hole, 20a: first opening, 20b: second opening, 21: first portion, 22: second portion, R: effective region, L: laser beam (energy beam), S: sample, S1: component.

The invention claimed is:

1. A sample support body for ionization of a sample, the sample support body comprising:
   a substrate including a first surface and a second surface on sides opposite to each other; and
   a conductive layer provided at least on the first surface,
   wherein a plurality of through-holes opening on the first surface and the second surface are formed in an effective region of the substrate, the effective region being for ionizing components of the sample,
   wherein a width of a second opening on the second surface side is larger than a width of a first opening on the first surface side in each of the plurality of through-holes,
   wherein each of the plurality of through-holes includes a first portion on the first opening side and a second portion on the second opening side, and
   wherein the second portion has a funnel shape expanding toward the second opening.

2. The sample support body according to claim 1, wherein, when viewed in a direction in which the first surface and the second surface are opposite to each other, an outer edge of the second opening is located outside an outer edge of the first opening in each of the plurality of through-holes.

3. The sample support body according to claim 1, wherein, a minimum value of the width is 1 nm, and a maximum value of the width is 700 nm in each of the plurality of through-holes.

4. The sample support body according to claim 1, wherein the substrate is formed by anodizing a valve metal or silicon.

5. The sample support body according to claim 1, wherein the conductive layer is formed of platinum or gold.

6. An ionization method comprising:
   a first process of preparing the sample support body according to claim 1;
   a second process of mounting the sample on a mount surface of a mount portion, and mounting the sample support body on the mount surface such that the second surface faces the sample; and
   a third process of ionizing components of the sample having moved to the first surface side through the plurality of through-holes by irradiating the first surface with an energy beam while applying a voltage to the conductive layer.

7. A mass spectrometry method comprising:
   the first process, the second process, and the third process of the ionization method according to claim 6; and
   a fourth process of detecting the components ionized in the third process.

8. A sample support body for ionization of a sample, the sample support body comprising:
   a substrate including a first surface and a second surface on sides opposite to each other; and
   a conductive layer provided at least on the first surface,
   wherein a plurality of through-holes opening on the first surface and the second surface are formed in an effective region of the substrate, the effective region being for ionizing components of the sample,
   wherein a width of a second opening on the second surface side is larger than a width of a first opening on the first surface side in each of the plurality of through-holes, and
   wherein each of the plurality of through-holes has a frustum shape expanding toward the second opening.

9. The sample support body according to claim 8, wherein, when viewed in a direction in which the first surface and the second surface are opposite to each other, an outer edge of the second opening is located outside an outer edge of the first opening in each of the plurality of through-holes.

10. The sample support body according to claim 8, wherein, a minimum value of the width is 1 nm, and a maximum value of the width is 700 nm in each of the plurality of through-holes.

11. The sample support body according to claim 8, wherein the substrate is formed by anodizing a valve metal or silicon.

12. The sample support body according to claim 8, wherein the conductive layer is formed of platinum or gold.

13. An ionization method comprising:
- a first process of preparing the sample support body according to claim 8;
- a second process of mounting the sample on a mount surface of a mount portion, and mounting the sample support body on the mount surface such that the second surface faces the sample; and
- a third process of ionizing components of the sample having moved to the first surface side through the plurality of through-holes by irradiating the first surface with an energy beam while applying a voltage to the conductive layer.

14. A mass spectrometry method comprising:
- the first process, the second process, and the third process of the ionization method according to claim 13; and
- a fourth process of detecting the components ionized in the third process.

* * * * *